Dec. 17, 1940.  B. F. W. HEYER  2,225,051
ONE METER BATTERY TESTER
Filed May 16, 1938  3 Sheets-Sheet 1
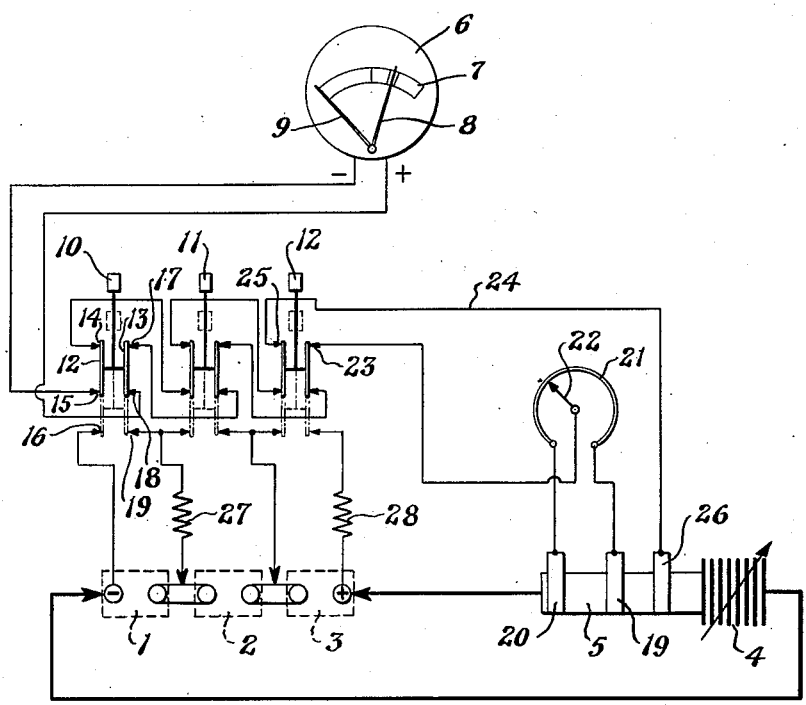
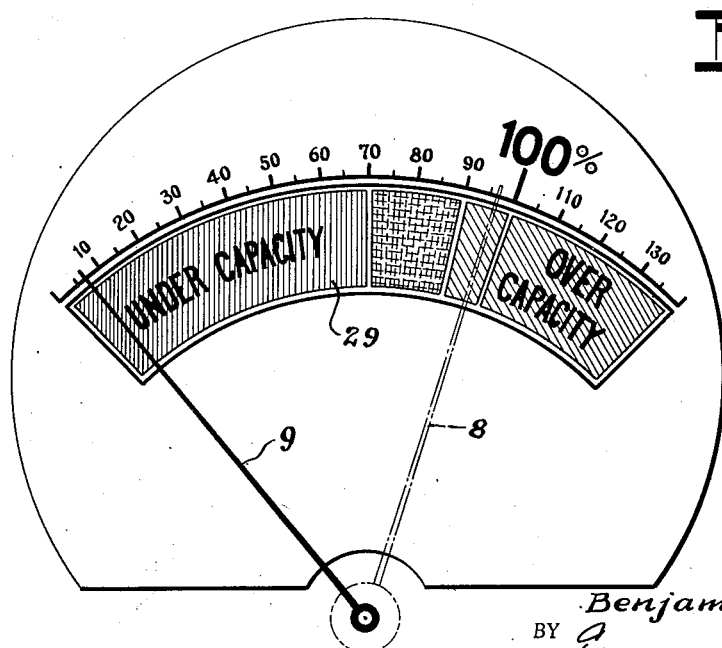
INVENTOR.
Benjamin F. W. Heyer
BY
ATTORNEY.

Dec. 17, 1940.  B. F. W. HEYER  2,225,051
ONE METER BATTERY TESTER
Filed May 16, 1938  3 Sheets-Sheet 2
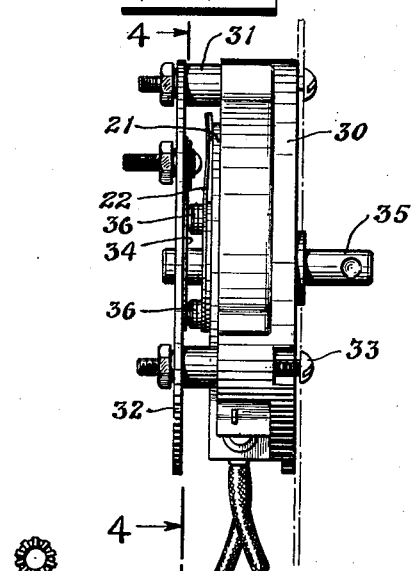
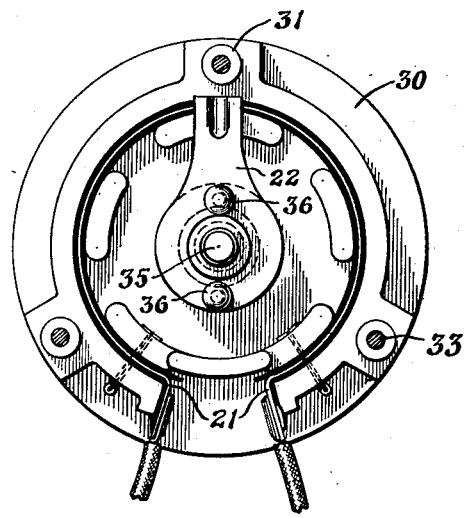
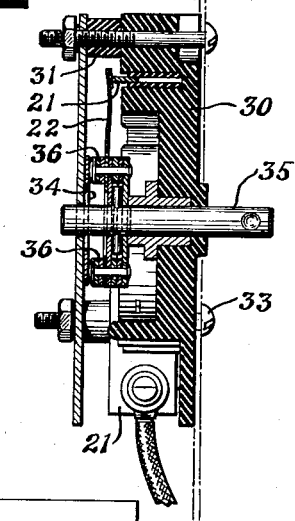
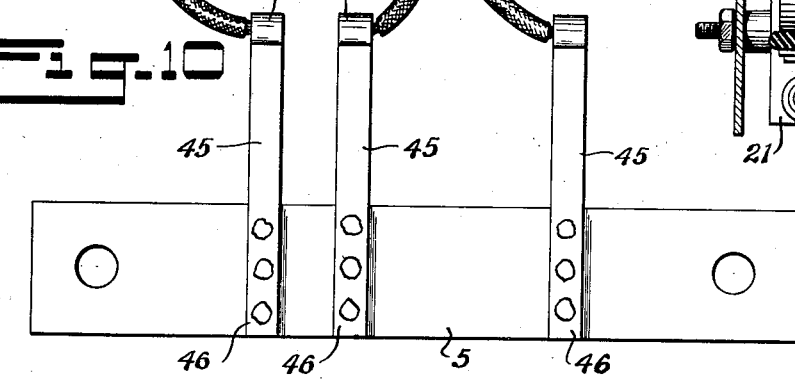
INVENTOR.
Benjamin F. W. Heyer
BY
ATTORNEY.

Dec. 17, 1940.   B. F. W. HEYER   2,225,051
ONE METER BATTERY TESTER
Filed May 16, 1938   3 Sheets-Sheet 3

INVENTOR.
Benjamin F. W. Heyer
BY
ATTORNEY.

Patented Dec. 17, 1940

2,225,051

UNITED STATES PATENT OFFICE 2,225,051

ONE METER BATTERY TESTER

Benjamin F. W. Heyer, Tenafly, N. J., assignor to Knickerbocker Development Corporation, Newark, N. J.

Application May 16, 1938, Serial No. 208,157

7 Claims. (Cl. 175—183)

My invention relates to a battery tester for storage batteries, in which a single meter is used, provided with a single scale, whereby the battery may be tested in a simple and efficient manner under conditions which may be easily understood by the usual non-expert driver.

I will hereinafter describe my invention in its approved form, from which various modifications in construction and operation will be readily understood. A part of the invention relates to an improved multiple switch, on which I am filing a separate patent application on even date herewith.

The present invention relates to an improved meter which may be alternately employed to indicate direct voltage readings and also ampere readings as indicated by voltage drop. With this meter I may make use of a single scale marked with suitable indicia, preferably representing percentage, in which 100% represents the optimum capacity of the battery.

With my approved battery tester I employ an adjustable carbon pile for providing the load representing the ampere draw required to operate various starters, which under a condition of full charge represents a voltage of 1.8 volts per cell or an overall voltage of 5.4 volts for the usual three cells.

In testing a three-cell battery, the cells are tested, preferably one at a time, by cutting out the ammeter circuit by means of said multiple switch and by then operating the carbon pile so as to gradually increase the load until the reading on the voltmeter indicates 100%. If the cell is charged and in good condition, this reading will correspond with the normal current draw on the cell, depending upon the size and number of plates. Should the cell be nearly discharged or below capacity, the voltage reading will represent an abnormally small current draw, indicating perhaps that the battery has deteriorated to such an extent as to require replacement.

In making the foregoing observation, there is interposed in circuit with the cell under test, a suitable multiplier or resistance, whereby the meter corresponds to an ordinary high resistance volt-meter. After this test has been made, the volt meter circuit is broken and the ammeter circuit is established, whereby the condition of the cell under full discharge is indicated.

If the battery is in good condition there will be little or no drop in the voltage after this second test, but if the cell is badly depleted in capacity, the voltage drop may be sufficient to indicate replacement. Thereupon the second and third cells are tested in the same way. Should these tests indicate that all three cells are in practically the same subvoltage condition, it may be reasonably assumed that the battery as a whole is insufficiently charged. When then the battery has been recharged, the foregoing tests are repeated and if it is then found that the condition of one or more cells fall below an arbitrary voltage point, say 70%, the battery is to be condemned and requires replacement.

With my improved tester, I make use of a so-called battery size selector by means of which the millivolt drop actuating the meter and caused by current flowing through the combination of the main shunt, and the auxiliary shunt may be varied so as to cause the meter to read at the same point for various values of current flowing through the combination of two shunts. The use of the auxiliary shunt, rather than the employment of a sliding contact on the main shunt, permits the employment of smaller mechanical parts operating on cooler surfaces and this also eliminates the problem of tapering the main shunt to give equal divisions on the battery size selector. In the normal position of the cell switch, the meter is connected across the combination of both shunts to indicate the millivolt drop caused by the load current flowing through said shunts. Depressing any of the cell switch buttons, breaks the ammeter circuit and connects the meter across the respective cell to be tested, this connection places resistance or multiplier 27 or 28 in series with the meter so as to cause it to function as a voltmeter.

The values of this battery size selector circuit are so chosen that when the battery is fully charged and in good condition the indication of the meter will read 100%, thus corresponding with the reading first obtained when the meter was connected in parallel with the battery or one of its cells with the beforementioned resistance in series therewith.

Preferably the so-called battery size selector is arranged to correspond in its readings not only with batteries of standard sized plates but as well with batteries of low or over-sized plates, as I will hereafter explain.

In other words, certain mail order houses and others in America put out batteries which have undersize plates contained in a case of standard size, thus deceiving the purchaser who may be ignorant of the practice, while other manufacturers in special cases make batteries with oversized plates and a correspondingly large battery case.

I find that if the resistance which is employed with the auxiliary shunt circuit, is of uniform value throughout its length, the indications on the battery size selector are required to be unevenly spaced so as to be crowded together at one end and stepped further and further apart towards the other end. Therefore, in order that these indications may be evenly spaced, I provide for an uneven proportioning of the resistance, several examples of which will be hereinafter explained.

A further improvement of my invention relates to the manner in which the auxiliary shunt is connected to the resistance of the battery size selector. When the large battery current traverses the main shunt under an assumed condition of load, that shunt often reaches a condition of red heat and therefore it becomes impossible to rely upon soldering to make the required connections while bolts or other mechanical means produce undesirable resistance in the meter circuit.

In order to overcome this, I make use of extended leads, several inches in length, which are spot welded to the main shunt at the appropriate points and to which leads are soldered, the wires extending to the auxiliary shunt of the battery size selector. In consequence the outer ends of these leads are so far removed from the main shunt, that they will be maintained at a safe temperature below the melting point of the solder used. Other forms of welding may be made use of instead of spot welding. In order to prevent a thermo-electric effect, the leads in question are formed of the same material as that of the main shunt.

In order to more fully understand my invention, attention is directed to the accompanying drawings forming a part of this specification and in which Figure 1 is a diagrammatic view of the circuits which are preferably used with my improved testing apparatus.

Figure 2 is a front view of my improved single meter, marked in percentage and with certain zones indicated thereon for simplifying the reading of the meter.

Figure 3 is a side view of the improved battery size selector.

Figure 4 is a front elevation of the same with the rear face removed.

Figure 5 is a vertical cross section of the same.

Figure 10 is an elevation showing the main shunt and the leads extending therefrom for making connection with the auxiliary shunt.

In all of the above views corresponding parts are indicated by the same reference numerals.

Figure 6:
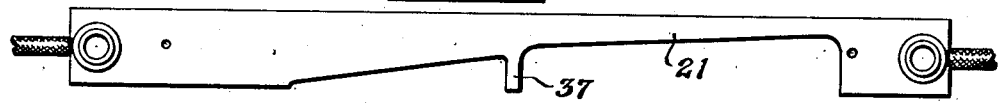
Figure 6 is an extended elevation of the preferred arrangement of the auxiliary shunt.

Referring first to Figure 1, I indicate the three cells of storage battery by the numerals 1, 2 and 3, the adjustable resistance such as a carbon pile by the numeral 4, the main shunt by the numeral 5 in series with the cells 1, 2, 3, the meter by the numeral 6, the scale by the numeral 7, the pointer of the meter by the number 8 and the hand adjusted pointer by the numeral 9.

The pushbuttons of the multiple switch are shown at 10, 11, and 12. The constructional details of this multiple switch are shown in my companion case filed on even date herewith, to which reference is made. The elements of the switch are normally in the positions shown in full lines but each switch may be moved to the positions shown in dotted lines. Taking the left hand switch 10, as an example, the pushbutton simultaneously operates two knife-edges 12 and 13, mechanically connected but electrically insulated from each other.

The knife blade 12 normally bridges contacts 14 and 15 but when the pushbutton is depressed this knife edge will bridge the contacts 15 and 16.

In normal position, the knife edge 13 will bridge contacts 17 and 18 but when the pushbutton is depressed it will bridge contacts 18 and 19. The same connection hold good for the other two switches 11 and 12.

Leading off from the main shunt 5 are two leads 19 and 20 connected to the end of an auxiliary shunt 21 in the battery size selector, the contact arm 22 which leads to a contact 23 in the ammeter circuit. A return connection 24 extends from a contact 25 and ampere circuit and connects with a lead 26 connected to the main shunt 5. It will be seen that the auxiliary shunt 21, which acts practically as a potentiometer, is indicated in the ampere circuit, which circuit is broken when any one of the pushbuttons 10, 11 and 12 is operated.

So-called multipliers or resistances 27 and 28 are arranged, the former being adapted to be connected in circuit with the battery cells 1 and 2, and the latter being adapted to be connected with the cell 3.

Referring now to Figures 3, 4, 5, I illustrate the constructional feature which relate to the so-called battery size selector employing the resistance 21 shown diagrammatically in Figure 1. This comprises a body 30 made preferably of molded insulation, having pillars 31 to which a back plate 32 is secured in any usual way, such as by the threaded nuts and bolt 33. Secured in any suitable way to the underside of the rear plate is a metal collector ring 34 which feeds current to the arm 22. The latter is secured in any suitable way to the operating shaft 35 and carries two studs 36—36 making contact with the collector ring.

The arm 22 is made of a suitable resilient metal so as to be held in firm contact with the auxiliary resistance 21 as shown particularly in Figure 5. As shown in this figure, the resistance 21 is maintained in a groove cast within the body 30. The extreme end is shown in Figure 6. The resistance 21 is formed with an integral part 37 which sets on the bottom of the receiving groove so as to add rigidity to the resistance 21.

Figure 9:
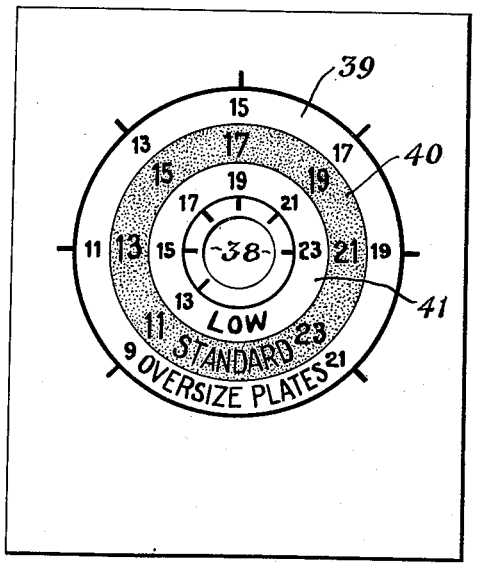
Figure 9 is a face view of the battery size selector.

As shown in Figure 9, the shaft 35 is rotated by a suitable knob 38, which cooperates with three scales 39, 40 and 41, whereby said knob may be adjusted with respect to any one of said scales. Scale 40 represents plates of standard size, with batteries of from 11 to 23 plates.

The scale 41 represents batteries with undersized plates running from 13 to 23 plates and corresponding to standard plates of from 11 to 21 plates. The oversize scale 39 (reading from 9 to 21) corresponds to standard sized batteries of from 11 to 23 plates. Undersized and oversized plates have been heretofore described. The markings on these various scales are so arranged with reference to the resistance 21 that when the knob 38 is set, for example, at 15 on the scale marked "Standard" a battery having 15 plates of standard size can be tested under conditions which represent the theoretical full discharge rate of the battery, as, for example, when operating a starter. The indications on the scales of the battery selector need not indicate the number and size of the plates, but may indicate model numbers, the number of square inches of plate area, amperes, or any other desired indication of battery capacity.

In order that the indications on the scales 39, 40 and 41 may be evenly spaced it is necessary that the resistance 21 should have a gradually increasing resistance in its linear dimension. Preferably this is effected by giving to the resistance, made of a suitable high resistance metal, a tapering shape as shown in Figure 6. This form can be conveniently and quickly produced by means of an ordinary die.

Figure 7:
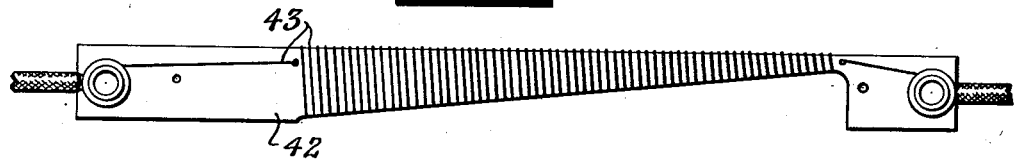
Figure 7 is a similar view illustrating a modification of the same.

With the modification shown in Figure 7, the same result is obtained by making use of a tapering mandrel or a tapering flat plate 42, made of a suitable insulating material around which a resistance wire 43 is wound. With the latter arrangement the mandrel or plate 42 may be made of metal, so long as the resistance wire 43 is properly insulated from it.

Figure 8:
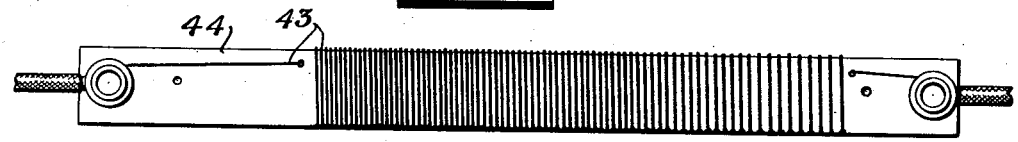
Figure 8 is a similar view showing a different modification.

Another modification for obtaining the desired result is shown in Figure 8, in which the supporting plate 44 is of rectangular shape and carries the resistance wire 43, with its convolutions spaced a gradually increasing distance apart.

Here also the supporting plate may be made of metal with the resistance wire 43 suitably insulated or said plate may be made of an insulating material upon which is wound the bare wire.

Referring now to Figure 10, I illustrate the way by which the connections to the auxiliary resistance 21 are properly associated with the main shunt 5. As I have heretofore pointed out, the very high temperature which is reached by said shunt, prevents the leads to the battery size selector from being soldered in position. In order to overcome this difficulty, I make use of three extended leads 45 of the same metal as the shunt 5 to prevent thermo-electric effects, which leads are spot-welded to the shunt 5 by spot welds 46. At the outer ends of these leads are loops 47 within which the wires leading to the battery sized selector are soldered. The temperature at the outer ends of these leads 45, is always below the soldering point and therefore the wires leading to the battery sized selector are always firmly held in position. While I prefer to spot weld the leads 45 in position on the shunt 5, it will be understood that other forms of welding may be made use of, such as so-called line welding or seam welding. Electric welding is preferred for the purpose, owing to its easy adaptation to the problem but other forms of welding may be utilized such as gas welding, so long as proper precautions are taken in doing the job.

The tester is used as follows: Assuming a three cell battery of 15 plates of standard size to be tested, it is connected to the tester as shown in Figure 1, the three cells being indicated therein as 1, 2 and 3. The battery size selector knob 38 is then turned until it is positioned at 15 on the "standard" scale, which moves contact arm 22 to the proper position on resistance 21 for testing this particular battery. To test the left-hand cell 1 of the battery, the push-button 10 of the multiple switch is depressed, which shifts the blades 12 and 13 into position shown in dotted lines in Figure 1 and completes the circuit between cell 1 and meter 6, through contacts 15 and 16 and 18 and 19. This will usually result in a meter indication above or below the 100% mark of its scale. At the same time the circuit between the meter 6 and auxiliary shunt 21 is broken.

Carbon pile 4 is now adjusted so as to gradually change the resistance in its circuit, which, as will be noted, runs from the negative post of cell 1 to the positive post of cell 3. This will also result in a gradual change of the current flowing through this circuit, including the shunt 5, and also through the meter circuit. As a consequence, the pointer 8 of meter 6 can be made to move gradually towards the 100% mark (Fig. 2). When the pointer is established at 100, this meter reading indicates that the current flowing in the main carbon pile circuit is that required to reduce the voltage of the particular cell under test to 1.8 volts. For the assumed battery of 15 plates of standard size, this current flow would ordinarily be 185 amperes, but it may be more or less, depending upon the condition of the cell. The tester is now in effect calibrated to determine in percentage whether this cell deviates from normal, and to what extent.

Push-button 10 is now released so that blades 12 and 13 of the multiple switch return to the full-line position shown in Figure 1. This breaks the direct circuit between cell 1 of the battery and meter 6, and establishes a circuit between meter 6 and auxiliary shunt 21. A definite percentage of the current flowing through main shunt 5 will now flow through the circuit of the auxiliary shunt 21 and may be indicated on meter 6 in terms of voltage drop. If the pointer 8 of meter comes to rest below the 100% mark, it indicates that the cell when discharging at the voltage of 1.8 cannot deliver the rated current, but only a certain percentage less than this. Or, in other words, that to deliver the rated current, the voltage would drop below 1.8 by this percentage. This indicates that cell 1 of the battery is either under-charged or defective to a greater or less degree.

Cell No. 2 is tested in a similar manner by first depressing push-button 11 of the multiple switch and adjusting the carbon pile, if necessary, to bring the meter 6 to the 100% reading, after which the push-button is released and the reading again taken, as heretofore described with respect to cell 1. Cell 3 is tested in a similar manner.

If, as a result of these tests of the three cells it is found that all of the readings, although less than 100%, are substantially the same, it may be assumed that the battery is under-charged; consequently, it should be charged and the test repeated. If it is then found that the meter reading for any cell is less than 70%, that cell may safely be assumed to be defective and the battery should be replaced to avoid sudden failure.

A meter reading of between 70 and 90 percentage indicates the condition which is neither bad nor good, but should be viewed with suspicion. A meter reading of 100%, of course, indicates a fully charged cell, presumably in perfect condition, and any reading higher than 100% indicates an over-capacity.

As a convenient means of comparing the readings of the meter for the different cells, the meter may be provided with a manually-adjustable hand 9, which can be set at the point indicated for the cell in best condition, and from this setting the difference in condition of the other cells can easily be determined in percentage. It has been found that if the cells vary by more than 20%, subsequent sudden failure is likely to occur and the battery should be condemned. It will be noted that when any one of the push-buttons 10, 11 and 12 is pressed, the corresponding cell of the battery is connected in series with the meter 6 through multiplier 27 and 28, as the case may be, and, in consequence, acts as a high resistance voltmeter. When the push-button is released, this circuit is broken and the circuit between the auxiliary shunt 21 and the meter is completed, with the result that the meter now does duty as a low-resistance ammeter through which a small current flows, it being assumed, of course, that the electrical characteristics of shunt 5, auxiliary shunt 21 and meter 6, and also the positions of leads 19, 20 and 26 on shunt 5, have been accurately determined so that the current flow through the circuit of auxiliary shunt 21 and meter 6 will produce the required deviation of the pointer 8.

By means of the above circuit arrangements, no currents of dangerously high value are impressed upon the meter or the elements in circuit therewith, so that they may be made reasonably small, light and compact.

When a battery of different size is to be tested, it is connected into the tester circuit, as heretofore described, the battery size selector adjusted to correspond with the battery and the tests conducted, as heretofore stated. If the battery first mentioned is shown on the meter to be 90% of the individual normal perfection of 100%, and this second battery also tests 90%, this indicates that both batteries are in substantially the same condition for the work which it is rated to perform. Of course, a small battery is able, theoretically, to do less work than a large battery, but if it tests 90%, it is still capable of doing 90% of the work for which it is designed. Similarly, a large battery if it tests 90% is still able to do 90% of the work for which it is designed. Therefore, by this tester, all batteries, irrespective of size, are reduced to a common basis. The condition of the battery is determined, not with relation to some theoretical standard, but in relation to its original rating. In consequence, a very clear understanding of what may be expected of it in future operation is obtained.

Having now described my invention what I claim as new therein and desire to secure by Letters Patent is as follows:

1. Apparatus for testing storage batteries, comprising in combination an adjustable carbon pile or the like, a single meter, a single scale for said meter, suitable indicia carried by said scale including an indication of the position on said scale corresponding to the normal good condition of the battery, a switching arrangement including a resistance or multiplier in series with the battery, means for adjusting the carbon pile to permit a flow of current to bring the meter into correspondence with said position and means to subsequently disconnect the resistance and connect the battery in series relationship to a variable resistance and the meter, whereby any voltage drop may be observed, said last-mentioned resistance acting as a battery size selector.

2. Apparatus for testing storage batteries, comprising in combination an adjustable carbon pile or the like, a single meter, a single scale for said meter, suitable indicia carried by said scale including an indication of the position on said scale corresponding to the normal good condition of the battery, a switching arrangement including a resistance or multiplier in series with the battery, means for adjusting the carbon pile to permit a flow of current to bring the meter into correspondence with said position and means to subsequently disconnect the resistance and connect the battery in series relationship to a variable resistance and the meter, whereby any voltage drop may be observed, said resistance constituting a battery size selector and being non-uniform, whereby a uniform spacing of said selector for batteries of different size is secured.

3. Apparatus for testing storage batteries comprising in combination, an adjustable carbon pile or the like, a single meter, a single scale for said meter, suitable indicia carried by said scale including an indication of the position on said scale corresponding to the normal good condition of the battery, a switching arrangement including a resistance or multiplier in series with the battery, means for adjusting the carbon pile to permit a flow of current to bring the meter into correspondence with said position and means to subsequently disconnect the resistance and connect the battery in series relationship to a variable resistance and the meter, whereby voltage drop may be observed, said variable resistance being of progressively increasing ohmic value from one end thereof to the other.

4. Apparatus for testing storage batteries including in combination a meter having a single scale, suitable indicia carried by said scale including an indication of the position corresponding to the normal good condition of the battery, a circuit including a shunt and an adjustable carbon pile adapted for connection to said battery, a second circuit adapted for connection to said battery and including said meter, a third circuit including a variable resistance and said meter in shunt with respect to said shunt, means for adjusting said carbon pile to permit a flow of current through said first and second circuits to bring the meter into correspondence with said position, and means in said second and third circuits for completing one and breaking the other.

5. Apparatus for testing storage batteries including in combination a meter having a single scale, suitable indicia carried by said scale including an indication of the position corresponding to the normal good condition of the battery, a circuit including a shunt and an adjustable resistance adapted for connection to said battery, a second circuit adapted for connection to said battery and including said meter, a third circuit including said meter and a variable resistance in shunt with respect to said shunt, means for adjusting said resistance to permit a flow of current through said first and second circuits to bring the meter into correspondence with said position, and means in said second and third circuits for completing one and breaking the other.

6. Apparatus for testing storage batteries including the combination of a meter, a single scale for said meter, suitable indicia carried by said scale including an indication of the position corresponding to the normal good condition of the battery, a circuit for connection to the opposite terminals of the battery which includes a shunt and an adjustable carbon pile, individual circuits including said meter and adapted for connection to the several cells of said battery, a third circuit in shunt relationship to said shunt and also including said meter, means for adjusting said carbon pile for regulating the flow of current so as to bring the meter into correspondence with said position, means for completing each of the individual circuits between the meter and the several cells of the battery and for breaking said circuits and closing said third circuit, said third circuit including a variable resistance whereby the adjustment of the carbon pile to bring the meter into the position representative of the battery in normal good condition may be so varied that equivalent deviations from normal of batteries of different rated capacities will produce identical deviations from normal upon the scale of the meter.

7. Apparatus for testing storage batteries including the combination of a meter, a single scale for said meter, suitable indicia carried by said scale including an indication of the position corresponding to the normal good condition of the battery, a circuit for connection to the opposite terminals of the battery which includes a shunt and an adjustable resistance, individual circuits including said meter and adapted for connection to the several cells of said battery, a third circuit in shunt relationship to said shunt and also including said meter, means for adjusting said resistance for regulating the flow of current so as to bring the meter into correspondence with said position, means for completing each of the individual circuits between the meter and the several cells of the battery and for breaking said circuits and closing said third circuit, including a variable resistance whereby the adjustment of the first-mentioned variable resistance to bring the meter into the position representative of the battery in normal good condition may be so varied that equivalent deviations from normal of batteries of different rated capacities will produce identical deviations from normal upon the scale of the meter.

BENJAMIN F. W. HEYER.